US006445533B1

(12) United States Patent
Stamm

(10) Patent No.: US 6,445,533 B1
(45) Date of Patent: Sep. 3, 2002

(54) TRANSFER LINKAGE FOR A CARTRIDGE ADAPTER OF A TAPE DRIVE

(75) Inventor: Stephen J. Stamm, Fort Lupton, CO (US)

(73) Assignee: Quantum Corporation, Milpitas, CA (US)

( * ) Notice: Subject to any disclaimer, the term of this patent is extended or adjusted under 35 U.S.C. 154(b) by 0 days.

(21) Appl. No.: 09/573,492

(22) Filed: May 16, 2000

(51) Int. Cl.[7] ............................................... G11B 15/66
(52) U.S. Cl. ......................................................... 360/94
(58) Field of Search ............................................ 360/94

(56) References Cited

U.S. PATENT DOCUMENTS

| | | |
|---|---|---|
| 3,864,743 A | 2/1975 | Staar |
| 3,922,719 A | 11/1975 | Negishi et al. |
| 3,964,099 A | 6/1976 | Sato |
| 4,602,300 A | 7/1986 | Ogata et al. |
| 5,016,834 A * | 5/1991 | Sato et al. ..................... 360/94 |
| 5,021,903 A | 6/1991 | Novak |
| 5,280,400 A | 1/1994 | Staub |
| 5,433,395 A | 7/1995 | Turgeon et al. |
| 6,034,850 A | 3/2000 | Del Genio et al. |

OTHER PUBLICATIONS

U.S. application No. 09/394,666, Stabile, et al., filed Sep. 13, 1999.

* cited by examiner

Primary Examiner—Robert S. Tupper
(74) Attorney, Agent, or Firm—Steven G. Roeder

(57) ABSTRACT

A cartridge adapter (16) that allows for a smaller form factor cartridge (14) to be used with a tape drive (12) is provided herein. The cartridge (14) includes a cartridge reel (18) and a reel lock (22). The reel lock (22) is movable between a locked position (26) and an unlocked position (24). The tape drive includes a receiver (34) and a release (28). The release (28) is movable relative to the receiver (34). The cartridge adapter (16) includes an adapter housing (100) and a transfer device (30). The adapter housing (100) fits within the receiver (34). The adapter housing (100) includes a cartridge slot (116) that receives the cartridge (14). As provided herein, the transfer device (30) includes a first device section (122) that engages the release (28) and a second device section (124) that engages the reel lock (22) so that movement of the release (28) results in movement of the reel lock (22). Uniquely, the first device section (122) is ramped so that movement of the release (28) results in substantially transverse movement of the transfer device (30). Additionally, the cartridge adapter (16) includes a device return (128) that is biased to move the transfer device (30) away from the reel lock (22).

20 Claims, 7 Drawing Sheets

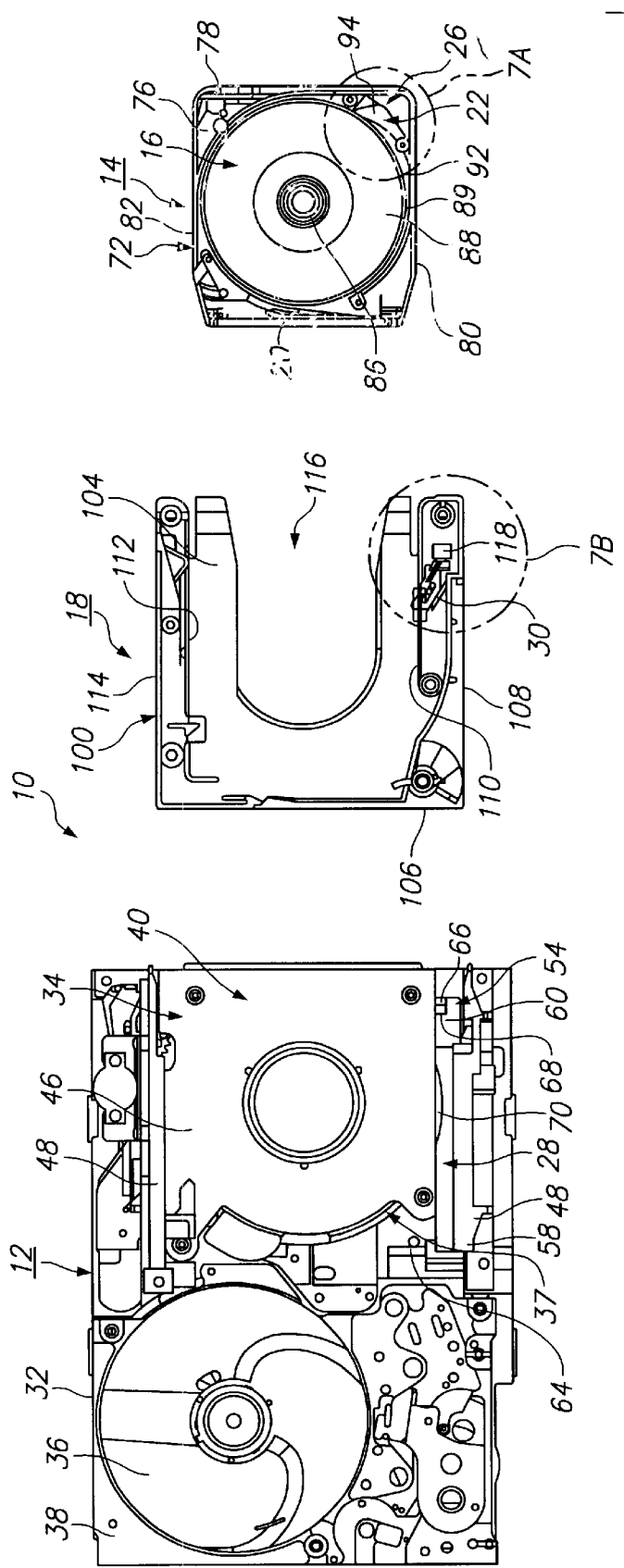

TRANSFER LINKAGE FOR A CARTRIDGE ADAPTER OF A TAPE DRIVE

FIELD OF THE INVENTION

The present invention relates generally to tape drives which use a removable cartridge having a storage tape. More specifically, the present invention relates to a transfer linkage for a cartridge adapter that allows the tape drive to receive and use a smaller sized cartridge.

BACKGROUND

Tape drives are widely used for storing information in digital form. These tape drives commonly use a storage tape having a thin film of magnetic material which receives the information. Typically, the storage tape is moved between a pair of spaced apart reels, past a data transducer. The data transducer records information onto the moving storage tape or reads information from the moving storage tape.

In one type of tape drive, one of the reels is part of the tape drive, while the other reel is part of a removable cartridge. For this type of tape drive system, the reel that is a part of the tape drive is commonly referred to as a take-up reel, while the reel that is a part of the cartridge is commonly referred to as a cartridge reel. With this system, upon insertion of the cartridge into the tape drive, it is necessary to couple the storage tape on the cartridge reel to the take-up reel of the tape drive. Subsequently, the storage tape must be uncoupled from the take-up reel, prior to removing the cartridge from the tape drive system.

Typically, a cartridge leader on the storage tape is automatically coupled to a drive leader that is connected to the take-up reel during insertion of the cartridge into the tape drive. The procedure of connecting the drive leader to the cartridge leader is commonly referred to as "buckling" or "coupling". Subsequently, during ejection of the cartridge, the cartridge leader is unbuckled from the drive leader.

The buckling operation will be successful if the leaders are in good condition and are properly positioned. However, the buckling operation will not be successful if one or both of the leaders is not in the proper position for coupling. Thus, it is necessary to prevent the cartridge leader from moving when the cartridge is outside the tape drive.

In order to inhibit movement of the cartridge leader, the cartridge includes a reel lock that engages the cartridge reel and inhibits rotation of the cartridge reel when the cartridge is outside the tape drive. After insertion of the cartridge into the tape drive, a release device of the tape drive engages the reel lock and moves the reel lock away from the cartridge reel. This allows the cartridge reel to rotate.

Recently, smaller sized cartridges have been developed. It is desirable to use the smaller cartridges with the existing tape drives. In order to allow for the use of the smaller sized cartridges with the existing tape drives, a cartridge adapter has been developed. One function of the cartridge adapter is to hold the smaller cartridge in the larger opening in the tape drive. Another function of the cartridge adapter is to transfer a force that normally acts upon the reel lock in the larger cartridge to the reel lock of the smaller cartridge. One type of cartridge adapter uses a motorized mechanism to convert the motion of the release device into the movement of the reel lock in the smaller cartridge. Unfortunately, the use of motorized mechanisms in the cartridge adapter increases the cost, complexity, and reliability of the cartridge adapter.

In light of the above, it is an object of the present invention to provide a transfer device for a cartridge adapter that simply and reliably transfers the motion of the release mechanism of the tape drive into movement of the reel lock in a smaller cartridge. Another object is to provide a cartridge adapter that is relatively easy and inexpensive to manufacture.

SUMMARY

The present invention is directed to a cartridge adapter for a tape drive that satisfies these objectives. The cartridge adapter is adapted for use with a cartridge and a tape drive. The cartridge includes a cartridge reel and a reel lock. The reel lock is movable between a locked position and an unlocked position. In the locked position, the reel lock inhibits rotation of the cartridge reel. In the unlocked position the reel lock allows for rotation of the cartridge reel. The tape drive includes a receiver and a release. The release is movable relative to the receiver.

As provided herein, the cartridge adapter includes an adapter housing and a transfer device. The adapter housing fits within the receiver and the cartridge fits within the adapter housing. The transfer device is secured to and moves relative to the adapter housing. The transfer device includes a first device section that engages the release and a second device section that engages the reel lock. With this design, movement of the release results in movement of the transfer device and the reel lock.

Uniquely, the transfer device coverts the vertical force of the release into a horizontal force that acts upon the reel lock of the cartridge. Stated another way, the transfer device moves substantially transversely to the movement of the release. Preferably, the first device section includes a ramped surface that engages the release and causes the transfer device to move transversely to the movement of the release.

Additionally, the adapter housing can include a guide and the transfer device can include a guide follower. The guide and the guide follower cooperate to allow the transfer device to slide substantially transversely to the movement of the release.

The present invention is also directed to a combination that includes a tape drive, the cartridge adapter, and a cartridge. Additionally, the present invention is also directed to a method for releasing a reel lock of a cartridge.

Importantly, the transfer device simply transfers the force that normally acts on a larger cartridge to the smaller cartridge. This enhances reliability of the cartridge adapter and reduces the cost for manufacturing the cartridge adapter.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 5 is a top plan view of the combination of FIG. 4A with the cartridge positioned outside the cartridge adapter and the cartridge adapter positioned outside the tape drive;

DESCRIPTION

Figure 1:
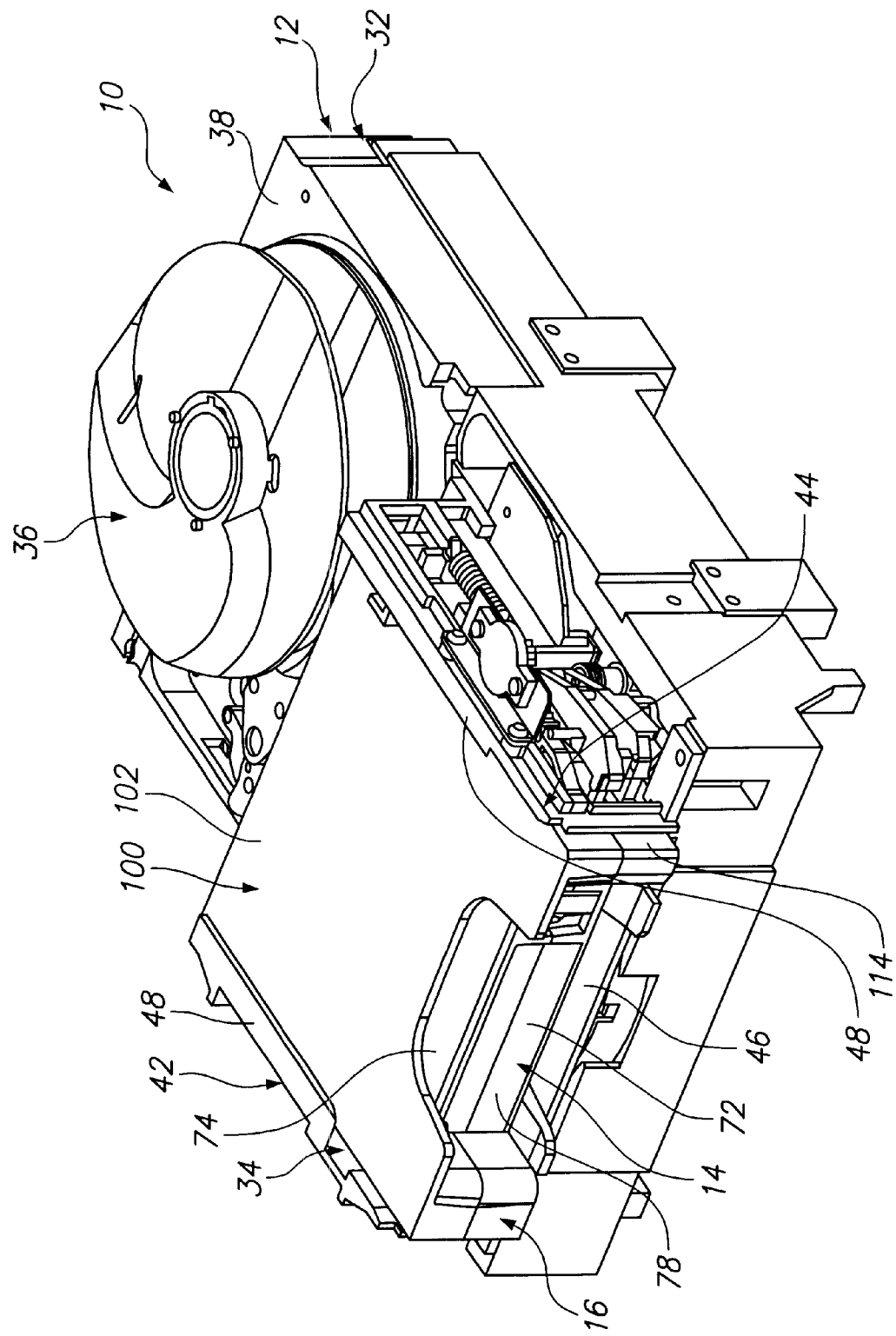
FIG. 1 is a perspective view of a combination including a cartridge, a cartridge adapter and a tape drive having features of the present invention.

Referring initially to FIGS. 1–5, a combination having features of the present invention includes a tape drive 12, a cartridge 14, and a cartridge adapter 16. As an overview, referring to FIGS. 4A and 5, the cartridge 14 includes a cartridge reel 18, a storage tape 20, and a reel lock 22. The reel lock 22 can be moved between a locked position 26 (illustrated in FIG. 5) in which the reel lock 22 inhibits rotation of the cartridge reel 18, and an unlocked position 24 (illustrated in FIG. 4A) in which the reel lock 22 does not interfere with rotation of the cartridge reel 18. The tape drive 12 includes a release 28 that moves relative to the cartridge 14.

Figure 3:
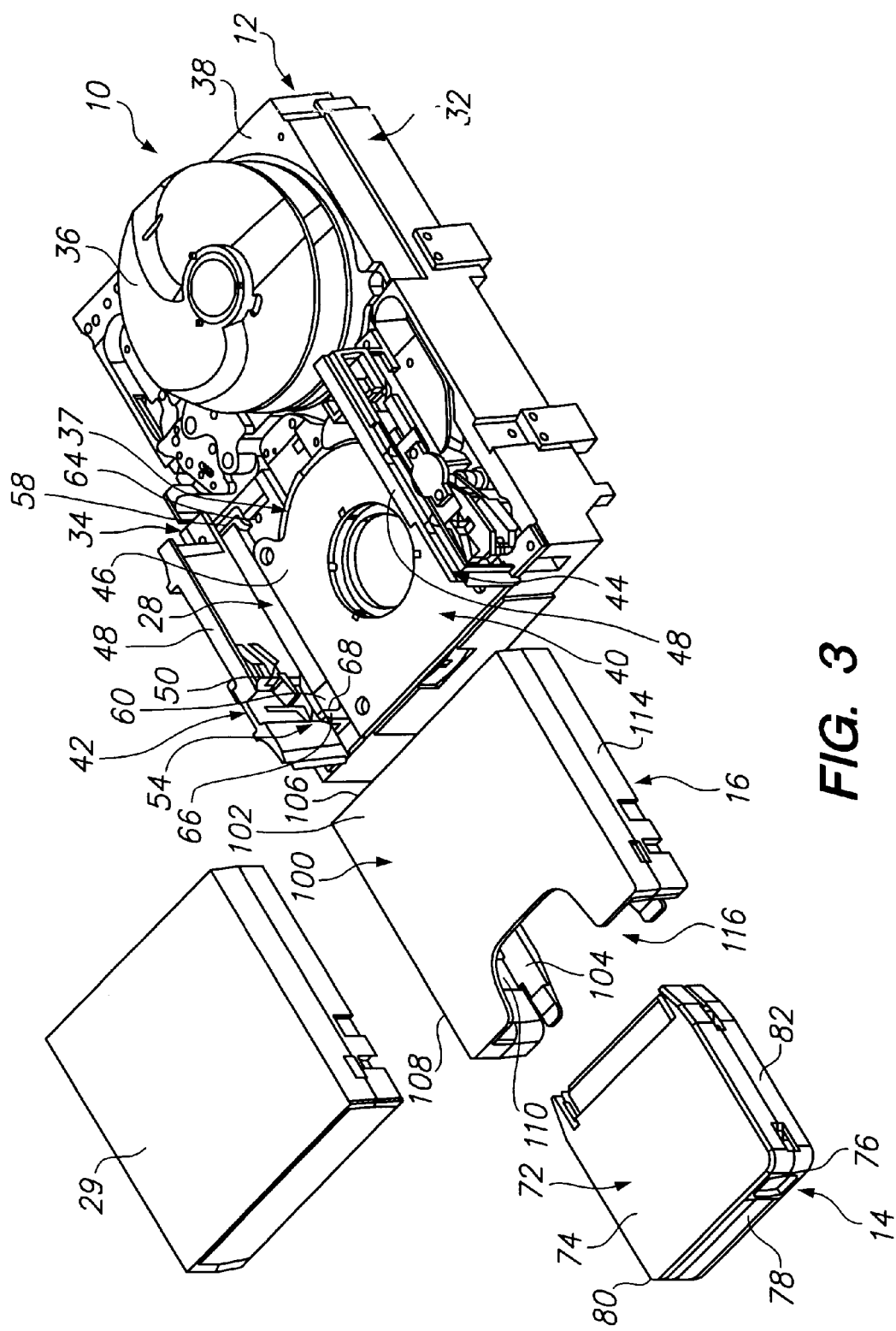
FIG. 3 is a perspective view of the combination of FIG. 1 with the cartridge and the cartridge adapter positioned outside of the tape drive; a large cartridge is also illustrated in FIG. 3.

Referring to FIG. 3, the tape drive 12 is designed for use with a large form factor, cartridge 29. The large sized cartridge 29 includes a reel lock (not shown) that is activated through a cartridge bottom (not shown) of the large sized cartridge 29. A suitable large cartridge 29 is sold by Quantum Corporation under the Trademark DLT™.

As provided herein, the cartridge adapter 16 allows the tape drive 12 to receive and use the smaller sized cartridge 14. The cartridge adapter 16 includes a transfer device that connects the release 28 to the reel lock 22. The transfer device allows the release 28 to move the reel lock 22 from the locked position 26 to the unlocked position 24. Uniquely, the transfer device 30 transfers the vertical force that normally acts on the large cartridge 29 to a horizontal force that acts on the smaller cartridge 14. The transfer device provided herein is reliable and relatively simple to manufacture.

The design of the tape drive 12 can be varied. A detailed description of the various components of a tape drive 12 is provided in U.S. Pat. No. 5,371,638, issued to Saliba, and assigned to Quantum Corporation, the Assignee of the present invention. The contents of U.S. Pat. No. 5,371,638 are incorporated herein by reference. Accordingly, only the structural aspects of a tape drive 12 which are particularly significant to the present invention are provided herein. Further, a number of the components of the tape drive 12 have been omitted from the figures for clarity. A representative tape drive 12 is sold by Quantum Corporation, the Assignee of the present invention under the trademark DLT™4000.

Referring to FIGS. 1–3, 4A, 5, and 6A, the tape drive 12 includes a device housing 32, a receiver 34, a take-up reel 36, the release 28, and a load ring 37. The device housing 32 retains the various components of the tape drive 12. The device housing 32 illustrated in the Figures includes a rectangular shaped base 38 that retains the various components of the tape drive 12.

The receiver 34 is sized and shaped to receive the cartridge adapter 16 or the large cartridge 29. Accordingly, the design of the receiver 34 can be varied to suit the design requirements of the cartridge adapter 16 and the large cartridge 29. In the embodiment illustrated in the Figures, the receiver 34 includes a rectangular shaped, receiver slot 40 that is sized and shaped to receive the cartridge adapter 16.

The receiver 34 illustrated in the Figures includes a left receiver side wall 42, a right receiver side wall 44, and a receiver bottom 46 which define the receiver slot 40. Each of the receiver side walls 42, 44 includes an upper lip 48 that extends transversely to the respective side wall 42, 44.

Additionally, the left receiver side wall 42 includes a protruding lip 50 that extends away from the left receiver side wall 42 towards the right receiver side wall 44. The protruding lip 50 contacts the cartridge adapter 16 during movement of the cartridge adapter 16 past the protruding lip 50, and causes a cartridge door (not shown) of the cartridge 14 to move from a closed position (not shown) to an open position (not shown).

The take-up reel 36 receives the storage tape from the cartridge 14 during operation of the tape drive 12. A take-up motor (not shown) selectively rotates the take-up reel 36. Clockwise rotation of the take-up reel 36 results in movement of the storage tape from the cartridge reel 18 onto the take-up reel 36. Alternately, counterclockwise rotation of the take-up reel 36 results in movement of the storage tape from the take-up reel 36 onto the cartridge reel 18.

The tape drive 12 also includes one or more data transducers, a plurality of tape guides, a buckler, and a cartridge reel motor, which has been omitted from the Figures. The one or more data transducers interact with the storage tape to read data from the storage tape or write data onto the storage tape 20. The tape guides guide the storage tape along a path past the data transducers and onto the take-up reel 36.

The buckler couples a drive leader (not shown) of the tape drive 12 to a cartridge leader (not shown) of the cartridge 14. The design of the buckler, the cartridge leader and the drive leader can be varied to suit the design requirements of the cartridge 14 and the tape drive 12. A suitable buckler, cartridge leader and drive leader are disclosed in U.S. Pat. No. 4,662,049, issued to Hertrich, and assigned to Quantum Corporation, the contents of which are incorporated herein by reference.

The cartridge reel motor engages the cartridge reel 18 and rotates the cartridge reel 18. More specifically, the cartridge reel motor is coupled to a drive gear mesh (not shown) that selectively extends into the receiver 34. The drive gear mesh engages a similar cartridge gear mesh (not shown) on the bottom of the cartridge reel 18 to link the cartridge reel motor to the cartridge reel 18. Subsequently, the cartridge reel motor is able to rotate the cartridge reel 18 in the cartridge 14.

The design of the release 28 can be varied to suit the design requirements of the tape drive 12. For the small cartridge 14, the release 28 engages the reel lock 22 with the transfer device to move the reel lock 22 between the locked position 26 and the unlocked position 24. Somewhat similarly, for the large cartridge 29, the release 28 directly engages the reel lock to move the reel lock between the locked position 26 and the unlocked position 24. In the embodiment illustrated in the Figures, the release 28 moves relative to the receiver 34 between a first release position 54 (illustrated in FIGS. 3 and 5) and a second release position 56 (illustrated in FIGS. 4A, 4B, 6A, and 6B).

In the first release position 54, the release 28 allows the reel lock 22 to move to the locked position 26. Alternately, in the second release position 56, the release 28 pushes the transfer device and forces the reel lock 22 to move to the unlocked position 24. Stated another way, in the first release position 54, the release 28 does not engage the transfer device and in the second release position 56, the release 28 engages the transfer device 30.

Referring to FIGS. 4A, 4B, 5, and 6A, the release 28 pivots near the left receiver side wall 42 out of and into the receiver slot 40. More specifically, in the first release position 54, the release 28 is positioned outside the receiver slot 40, and in second release position 56, a portion of the release 28 is positioned within the receiver slot 40.

In the embodiment illustrated in the Figures, the release 28 is somewhat beam shaped and includes a first release end 58 and a second release end 60. The first release end 58 includes an aperture 62 that receives an attachment pin 64. The attachment pin 64 is secured to the device housing 32. With this design, the release 28 pivots upon the attachment pin 64 and the second release end 60 pivots relative to the first release end 58 and the device housing 32.

The second release end 60 includes an engagement lip 66 that extends substantially transversely from the second release end 60. The engagement lip 66 includes an engagement surface 68 that engages the transfer device 30. With the design provided herein, the entire release 28 is positioned below the receiver bottom 46 when the release 28 is in the first release position 54. Alternately, when the release 28 is in the second release position 56, the engagement lip 66 is positioned above the receiver bottom 46 in the receiver slot 40, and extends substantially perpendicularly to the receiver bottom 46. Stated another way, in the second release position 56, the release 28 is generally horizontal except that the engagement lip 66 extends vertically.

Movement of the release 28 from the first release position 54 to the second release position 56 moves the engagement lip 66 substantially vertically upward and transversely to the receiver slot 40. Alternately, movement of the release 28 from the second release position 56 to the first release position 54 moves the engagement lip 66 substantially vertically downward and transversely to the receiver slot 40.

The load ring 37 is disk shaped and is positioned below the receiver bottom 46. A buckler motor (not shown) is coupled to and selectively rotates the load ring 37 relative the receiver 34. Referring to FIG. 5, the load ring 37 includes a ramped edge 70 near a circumference of the load ring 37. The ramped edge 70 engages the release 28 so that counterclockwise rotation of the load ring 37 results in movement of the release 28 between the first release position 54 and the second release position 56. Alternately, clockwise rotation of the load ring 37 results in movement of the release 28 from the second release position 56 to the first release position 54. With the design provided herein, rotation of the load ring 37 results in movement of the release 28, movement of the transfer device 30, and movement of the reel lock 22.

Referring to FIGS. 3 and 5, the cartridge 14 includes a cartridge housing 72, the cartridge reel 18, the storage tape wrapped around the cartridge reel 18, and the reel lock 22. The cartridge housing 72 is hollow, substantially rectangular shaped and encloses the cartridge reel 18, the storage tape 20, and the reel lock 22. The cartridge housing 72 includes a cartridge top 74, a cartridge bottom 76, a front cartridge door (not shown), a cartridge rear 78, a cartridge left side 80, and a cartridge right side 82 that define the cartridge housing 72. The cartridge door can be pivoted between an open position in which the storage tape is exposed and a closed position in which the storage tape is not exposed.

The cartridge housing 72 also includes a brake opening 84 (illustrated in FIGS. 4A, 4B) that extends through the cartridge left side 80 near the cartridge rear 78 and near the reel lock 22. The brake opening 84 is sized and shaped so that a portion of the transfer device can extend through the cartridge left side 80 and engage the reel lock 22.

The cartridge reel 18 receives the storage tape and is positioned within the cartridge housing 72. The cartridge reel 18 includes a tubular shaped hub 86 and a pair of disk shaped, spaced a part reel sides 88 (only one is illustrated in the Figures). An outer circumference 89 of one of the reel sides 88 includes a plurality of notches (not shown).

The storage tape stores data in a form that can be subsequently retrieved if necessary. A magnetic storage tape is commonly used to store data in digital form. The storage tape is initially retained on the cartridge reel 18 of the cartridge 14.

The reel lock 22 is positioned within the cartridge housing 72. As provided above, the reel lock 22 is movable between the locked position 26 and the unlocked position 24. In the locked position 26, the reel lock 22 engages the notches in the cartridge reel 18 and inhibits rotation of the cartridge reel 18. In the unlocked position 24 the reel lock 22 does not engage the cartridge reel 18 and the cartridge reel 18 is free to rotate.

The design of the reel lock 22 can be varied to suit the design requirements of the cartridge 14. In the embodiment illustrated in FIGS. 4A, 4B, 5, and 7A, the reel lock 22 is positioned in one of the corners of the cartridge housing 72 between the cartridge reel 18, the cartridge left side 80 and the cartridge rear 78.

The reel lock 22 includes a lock body 90 having a first lock end 92 and an opposed second lock end 94. The first lock end 92 is somewhat wedge shaped and is engaged by the transfer device 30. The second lock end 94 includes a plurality of teeth 95 that are designed to engage the notches in the cartridge reel 18.

The lock body 90 includes a lock aperture 96 positioned between the lock ends 92, 94 but closer to the first lock end 92. The lock aperture 96 receives a lock attachment pin 98. The lock attachment pin 98 is secured to the cartridge housing 72. With this design, the reel lock 22 pivots upon the lock attachment pin 98 relative to the cartridge reel 18 between the unlocked position 24 and the locked position 26. A biasing device (not shown), i.e. a spring, biases the reel lock 22 to rotate towards the locked position 26.

The cartridge adapter 16 allows the tape drive 12 to receive and use the smaller sized cartridge 14. The design of the cartridge adapter 16 varies according to the design of the tape drive 12 and the cartridge 14. In the embodiment illustrated in the Figures, the cartridge adapter 16 includes an adapter housing 100 and the transfer device 30.

Referring to FIGS. 2, 3, 4A, and 5, the adapter housing 100 is sized and shaped to fit within the receiver 34 of the tape drive 12. The adapter housing 100 is somewhat hollow rectangular shaped and the outer shell is shaped somewhat similar to the large cartridge 29 illustrated in FIG. 3. The adapter housing 100 includes an adapter top 102, an adapter bottom 104, an adapter front 106, an adapter outer left wall 108, an adapter inner left wall 110, an adapter inner right wall 112, and an adapter outer right wall 114. The adapter top 102, the adapter bottom 104, the adapter front 106, the adapter inner left wall 110, and the adapter inner right wall 112 cooperate to define a rectangular shaped cartridge slot 116 that is sized and shaped to receive the cartridge 14.

The adapter bottom 104 includes a rectangular shaped adapter opening 118 near the transfer device intermediate the adapter left walls 108, 110. The adapter opening 118 allows the engagement lip 66 of the release 28 to selectively extend into the cartridge adapter 16 and engage the transfer device 30.

The cartridge adapter 16 also includes an adapter guide 120 that guides the movement of the transfer device relative to the adapter housing 100. In the embodiment illustrated herein, the adapter guide 120 is a rod having a circular shaped cross-section that extends between the adapter top 102 and the adapter bottom 104 between the adapter left walls 108, 110.

The transfer device is positioned between the adapter left walls 108, 110 near the back of the cartridge adapter 16. The transfer device is secured to and moves relative to the adapter housing 100. The transfer device includes a device body 121, a first device section 122, a second device 124, a guide follower 126, and a device return 128.

The first device section 122 engages the release 28. The first device section 122 is uniquely shaped to transfer the substantially vertical force from the engagement surface 68 into a substantially horizontal movement of the transfer device 30. Stated another way, the first device section 122 is uniquely shaped so that the transfer device moves substantially transversely to the movement of the engagement lip 66. Referring to FIGS. 6A, 6B, 8A, and 8B, the first device section 122 includes a ramped surface 130 that engages the release 28. The ramped surface 130 transfers the substantially vertical force from the engagement surface 68 into substantially horizontal movement of the transfer device 30. The angle of the ramped surface 130 can be varied. As provided herein, the ramped surface 130 can extend between approximately 45 and 90 degrees; and more preferably between 60 and 90 relative to the adapter bottom 104.

Figure 4A:
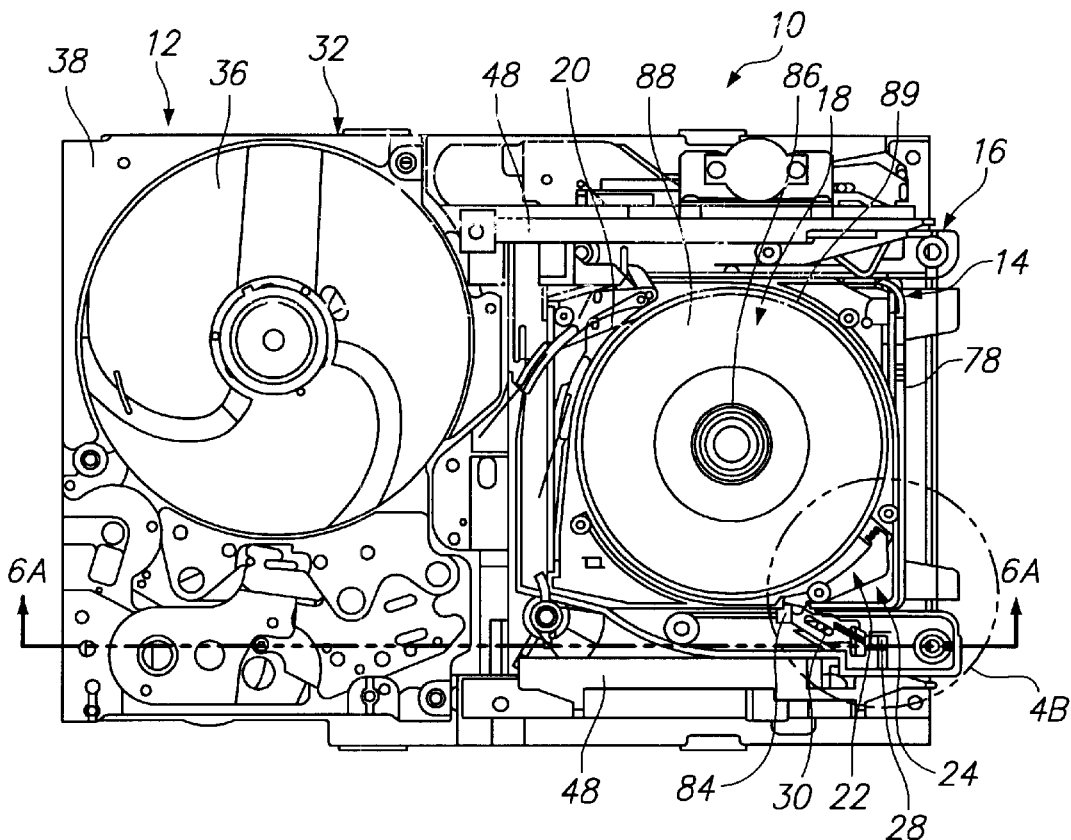
FIG. 4A is top plan view of combination of FIG. 1 with a cartridge top of the cartridge, and an adapter top of the cartridge adapter removed for clarity.
Figure 4B:
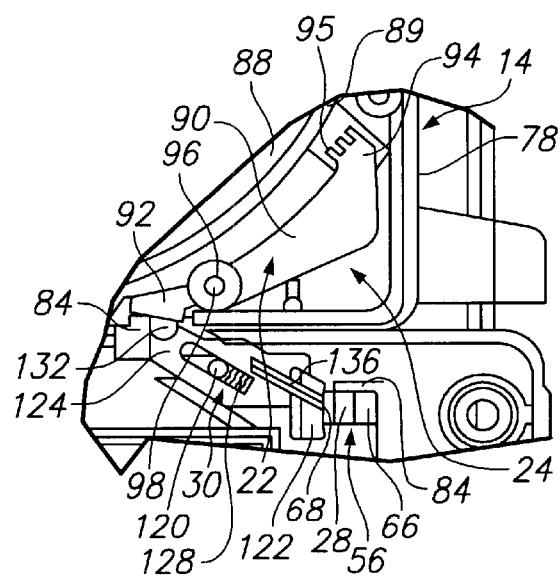
FIG. 4B is an enlarged detail view taken on line 4B in FIG. 4A.
Figure 8A:
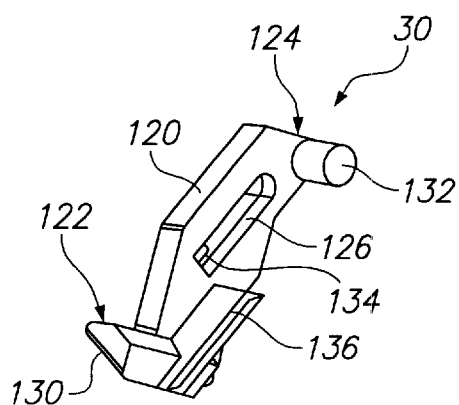
FIG. 8A is a perspective view of a transfer device having features of the present invention.
Figure 8B:
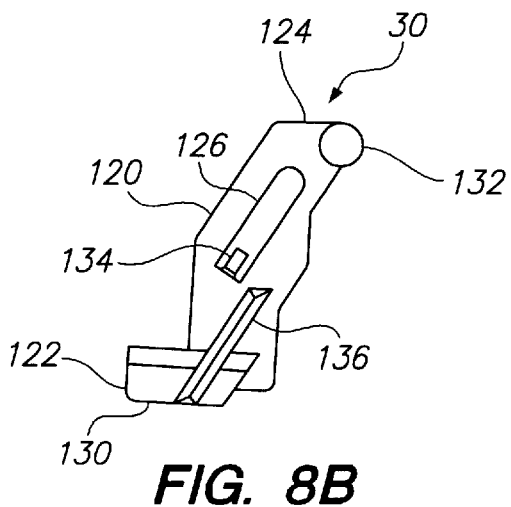
FIG. 8B is a top plan view of the transfer device of FIG. 8A.

The second device section 124 is shaped to engage the first lock end 92 of the reel lock 22. Referring to FIGS. 4B, 8A, and 8B, the second device section 124 includes a beam 132 that cantilevers above the device body 121 to engage the reel lock 22. In this embodiment, the beam 132 has a circular cross-section.

The guide follower 126 allows the transfer device to be guided by the adapter guide 120 during movement relative to the adapter housing 100. In the embodiment illustrated in the Figures, the guide follower 126 is a slot that extends along the device body 121. The slot is sized and shaped to receive the adapter guide 120. The guide follower 126 cooperates with its adapter guide 120 so that the transfer device moves substantially transversely to the movement of the engagement lip 66.

The device return 128 is biased to move the transfer device away from the reel lock 22. This allows the reel lock 22 to move towards the locked position 26. The design of the device return 128 can be varied to suit the design requirements of the transfer device 30. In the embodiments illustrated in the Figures, the device return 128 is a resilient member such as a spring that extends between the adapter guide 120 and one end of the slot. A circular boss 134 extends into the slot to retain the resilient member in the proper location. The resilient member urges the transfer device towards the release 28 and the adapter outer left wall 108.

It should be noted that the transfer device also includes a device lip 136 that extends upwardly from the device body 121 near the first device section 122. The device lip 136 engages the adapter top 102 and holds the transfer device in position during the movement of the release 28.

Figure 9:
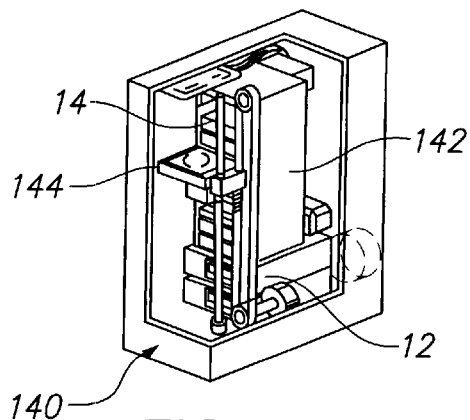
FIG. 9 is a perspective, partly cut-away view of a tape library having features of the present invention.

The tape drive 12 is typically installed within a computer (not shown), or a word processor (not shown). Alternately, the tape drive 12 can be utilized as part of a tape library 140. In the embodiment illustrated in FIG. 9, the tape library 140 includes a plurality of cartridges 14 that are retained in a multiple cartridge magazine 142, a robotic cartridge handler 144, and a pair of tape drives 12. The robotic cartridge handler 144 is used to selectively retrieve one of the cartridges 14 from the cartridge magazine 142 and place the cartridge 14 within one of the tape drives 12.

Figure 2:
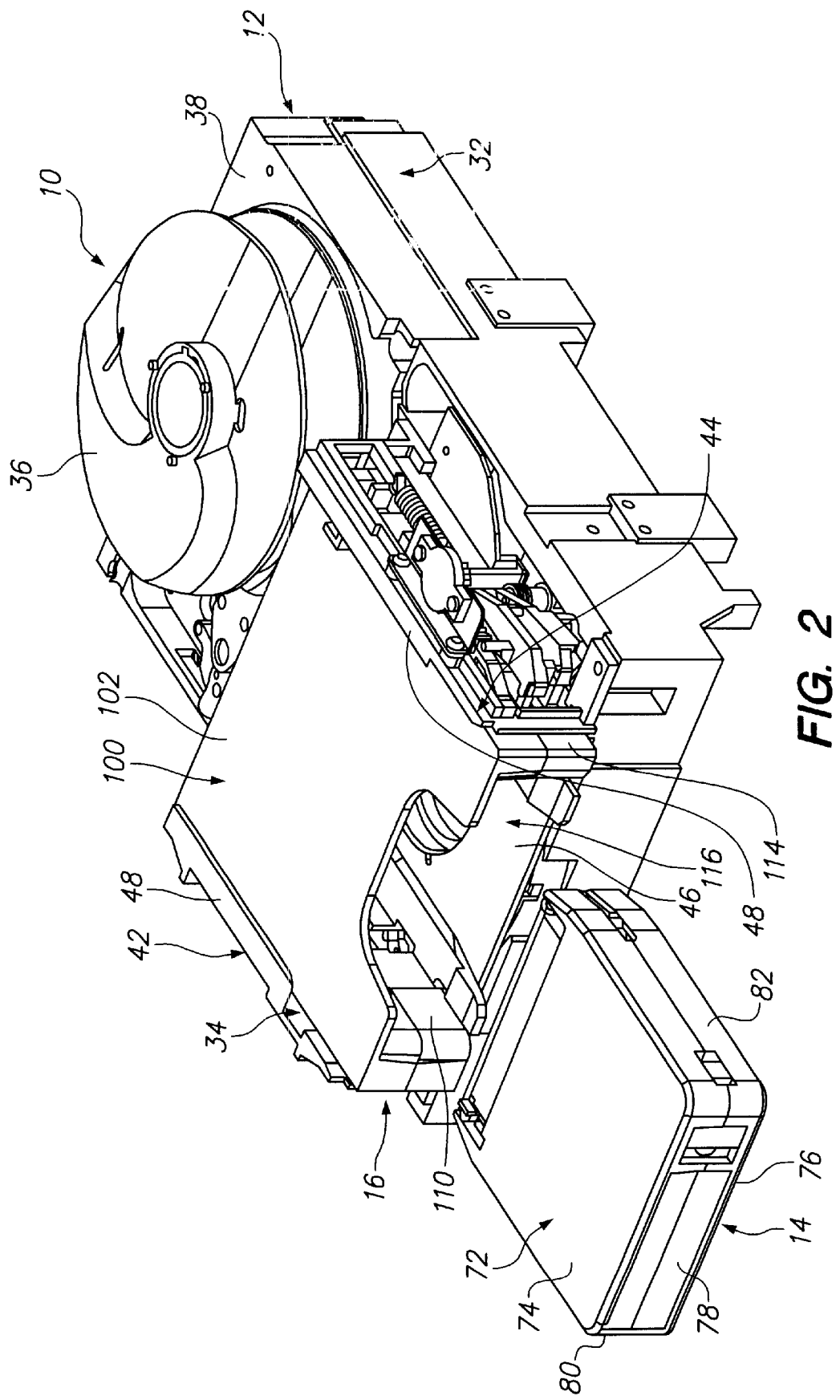
FIG. 2 is a perspective view of the combination of FIG. 1 with the cartridge positioned outside of the cartridge adapter and the tape drive.
Figure 6A:
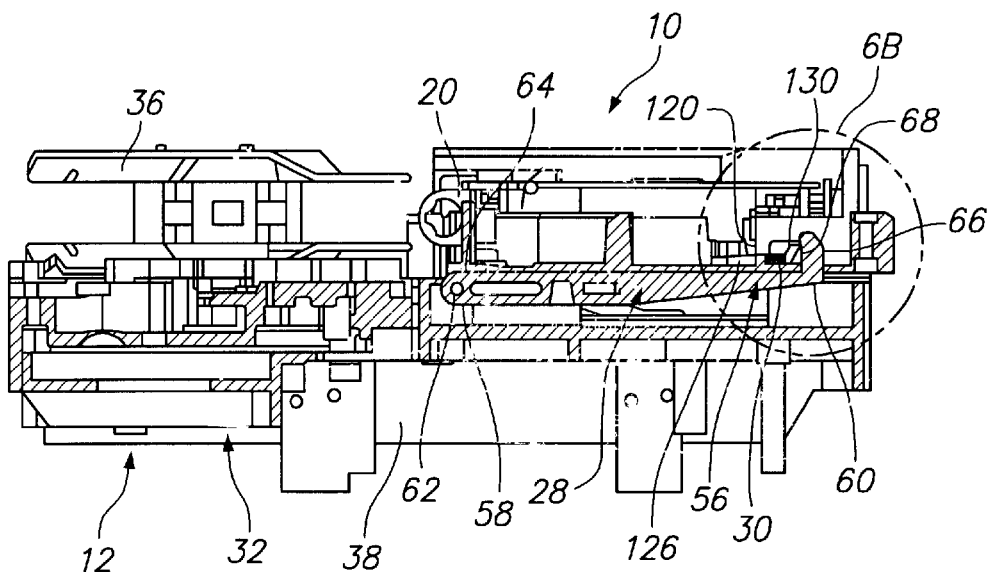
FIG. 6A is a cross-sectional view taken on line 6A–6A on FIG. 4A.
Figure 6B:
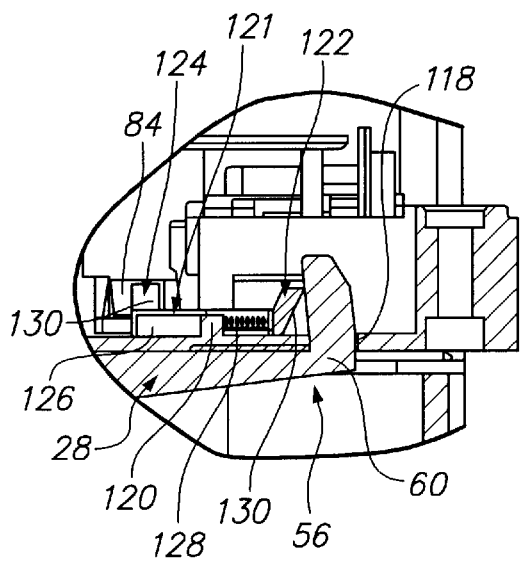
FIG. 6B is an enlarged detail view taken on line 6B in FIG. 6A.
Figure 7A:
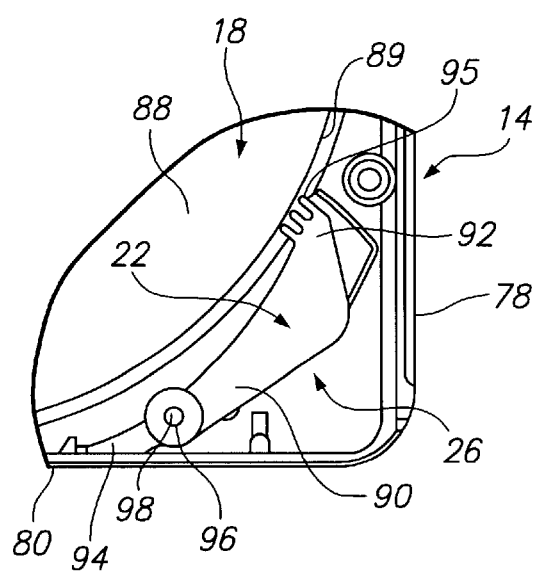
FIG. 7A is an enlarged detail view taken on line 7A in FIG. 5.
Figure 7B:
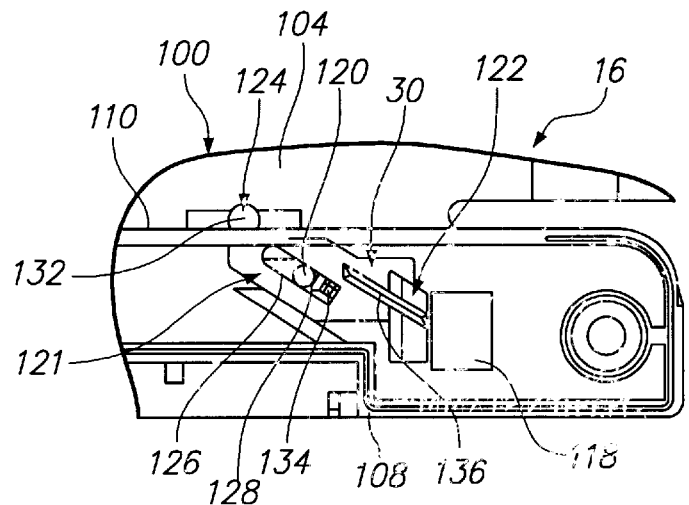
FIG. 7B is an enlarged detail view taken on line 7B in FIG. 6.

Operation of the tape drive 12 and cartridge adapter 16 can probably best be understood with initial reference to FIGS. 1–3. Initially, the cartridge adapter 16 is inserted into the receiver 34 of the tape drive 12. Next, the cartridge 14 is inserted into the cartridge adapter 16. Referring to FIGS. 4A and 5, once the cartridge 14 is inserted, the buckler motor rotates the load ring 37 in the counterclockwise direction. This movement causes the release 28 to pivot upwardly and the engagement lip 66 to move vertically into the cartridge adapter 16. Referring to FIGS. 6A and 6B, the engagement surface 68 engages the ramped surface 130 of the transfer device and forces the transfer device against the device return 128 towards the cartridge 14. The second device section 124 of the transfer device engages the first lock end 92 of the reel lock 22 and causes the reel lock 22 to rotate against the reel return from the locked position 26 towards the unlocked position 24. Now the cartridge reel 18 can be rotated.

During unloading of the cartridge 14, the buckler motor rotates the load ring 37 in the clockwise direction. This movement causes the release 28 to pivot downwardly and the engagement lip 66 to move vertically downwardly out of the cartridge adapter 16. At this time, the device return 128 forces the transfer device to slide horizontally away from the cartridge 14. This movement allows the lock return to urge the reel lock 22 from the unlocked position 24 towards the locked position 26. Now the cartridge 14 can be removed.

Importantly, with the present invention, the transfer device transfers the force that normally acts on the large cartridge 29 to the smaller cartridge 14. Further, the transfer device is relatively easy to manufacture and reliably transfers the force from the release 28 to the reel lock 22.

While the particular combination and cartridge adapter 16 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

GLOSSARY
11198.35-QUANTUM CORPORATION-Q00-1044-US1
A TRANSFER LINKAGE FOR A CARTRIDGE ADAPTER OF A TAPE DRIVE

| | | | | | |
|---|---|---|---|---|---|
| 10 | combination | 68 | engagement surface | 122 | first device section |
| 12 | tape drive | 70 | ramped edge | 124 | second device section |
| 14 | cartridge | 72 | cartridge housing | 126 | guide follower |
| 16 | cartridge adapter | 74 | cartridge top | 128 | device return |
| 18 | cartridge reel | 76 | cartridge bottom | 130 | ramped surface |
| 20 | storage tape | 78 | cartridge rear | 132 | beam |
| 22 | reel lock | 80 | cartridge left side | 134 | boss |
| 24 | unlocked position | 82 | cartridge right side | 136 | device lip |
| 26 | locked position | 84 | brake opening | 140 | tape library |
| 28 | release | 86 | hub | 142 | cartridge magazine |
| 29 | large cartridge | 88 | reel sides | 144 | cartridge handler |
| 30 | transfer device | 89 | outer circumference | | |
| 32 | device housing | 90 | lock body | | |
| 34 | receiver | 92 | first lock end | | |
| 36 | take-up reel | 94 | second lock end | | |
| 37 | load ring | 95 | teeth | | |
| 38 | base | 96 | lock aperture | | |
| 40 | receiver slot | 98 | lock attachment pin | | |
| 42 | left receiver side wall | 100 | adapter housing | | |
| 44 | right receiver side wall | 102 | adapter top | | |
| 46 | receiver bottom | 104 | adapter bottom | | |
| 48 | upper lip | 106 | adapter front | | |
| 50 | protruding lip | 108 | an adapter outer left wall | | |
| 54 | first release position | 110 | an adapter inner left wall | | |
| 56 | second release position | 112 | an adapter inner right wall | | |
| 58 | first release end | 114 | an adapter outer right wall | | |
| 60 | second release end | 116 | cartridge slot | | |
| 62 | aperture | 118 | adapter opening | | |
| 64 | attachment pin | 120 | adapter guide | | |
| 66 | engagement lip | 121 | device body | | |

What is claimed is:

1. A cartridge adapter adapted for use with a cartridge and a tape drive, the cartridge including a cartridge reel and a reel lock, the reel lock being movable between a locked position in which the reel lock inhibits rotation of the cartridge reel and an unlocked position in which the reel lock allows for rotation of the cartridge reel, the tape drive including a receiver and a release, the release being movable relative to the receiver, the cartridge adapter comprising:

an adapter housing that is adapted to fit with the receiver, the adapter housing including a cartridge slot that is sized and shaped to receive the cartridge; and a transfer device that is secured to and moves relative to the adapter housing, the transfer device including a first device section that is engaged by the release and a second device section that engages the reel lock so that movement of the release results in movement of the reel lock.

2. The cartridge adapter of claim 1 wherein the transfer device slides relative to the adapter housing.

3. The cartridge adapter of claim 1 wherein the transfer device moves substantially transversely to the movement of the release.

4. The cartridge adapter of claim 1 further comprising a guide that is secured to the adapted housing and wherein the transfer device includes a guide follower that cooperates with the guide so that the transfer device moves substantially transversely to the movement of the release.

5. The cartridge adapter of claim 4 further comprising a device return that is biased to move the transfer device away from the reel lock.

6. The cartridge adapter of claim 1 wherein the first device section includes a ramped surface that engages the release.

7. The cartridge adapter of claim 6 wherein the transfer device converts a substantially vertical force of the release into a substantially horizontal force that is transferred to the reel lock.

8. A combination including a tape drive and the cartridge adapter of claim 1 positioned within the tape drive.

9. The combination of claim 8 including a cartridge positioned within the cartridge slot of the cartridge adapter.

10. A tape library including a library housing and the combination of claim 8 positioned within the library housing.

11. A combination including the cartridge adapter of claim 1 and a cartridge positioned within the cartridge slot.

12. A method for releasing a reel lock in a cartridge with a tape drive, the cartridge including a cartridge reel, the reel lock being movable between a locked position in which the reel lock inhibits rotation of the cartridge reel and an unlocked position in which the reel lock allows for rotation of the cartridge reel, the tape drive including a receiver and a release, the release being movable relative to the receiver, the method comprising the steps of:

providing a cartridge adapter, the cartridge adapter including an adapter housing and a transfer device, the adapter housing being adapted to fit with the receiver, the adapter housing including a cartridge slot that is sized and shaped to receive the cartridge, the transfer device being adapted to move relative to the adapter housing, the transfer device including a first device section that engages the release and a second device section that engages the reel lock so that movement of the release results in movement of the reel lock.

13. The method of claim 12 including the step of moving the transfer device substantially transversely to the movement of the release.

14. The method of claim 12 including the step of guiding the movement of the transfer device so that the transfer device moves substantially transversely to the release.

15. The method of claim 12 including the step of biasing the transfer device to move away from the reel lock.

16. A cartridge adapter that is adapted for use with a cartridge and a tape drive, the cartridge including a cartridge reel and a reel lock, the reel lock being movable between a locked position in which the reel lock inhibits rotation of the cartridge reel and an unlocked position in which the reel lock allows for rotation of the cartridge reel, the tape drive including a receiver and a release, the release being movable relative to the receiver, the cartridge adapter comprising:

an adapter housing that is adapted to fit with the receiver, the adapter housing including a cartridge slot that is sized and shaped to receive the cartridge; and a transfer device that is secured to and moves relative to the adapter housing, the transfer device including a first device section that engages the release so that movement of the release results in movement of the transfer device substantially transversely to the movement of the release, and a second device section that engages the reel lock so that movement of the transfer device results in the movement of the reel lock.

17. The cartridge adapter of claim 16 wherein the first device section of the transfer device includes a ramped section that engages the release.

18. The cartridge adapter of claim 16 further comprising a guide that is secured to the adapted housing and wherein the transfer device includes a guide follower that cooperates with the guide so that the transfer device moves substantially transversely to the movement of the release.

19. A combination including a tape drive and the cartridge adapter of claim 16 positioned within the tape drive.

20. A tape library including a library housing and the combination of claim 19 positioned within the library housing.

* * * * *